Feb. 15, 1949.   L. A. MEACHAM   2,461,832
PHASE SHIFTING APPARATUS
Original Filed June 22, 1943

INVENTOR
L. A. MEACHAM
BY
*G. F. Heuerman*
ATTORNEY

Patented Feb. 15, 1949

2,461,832

UNITED STATES PATENT OFFICE 2,461,832

PHASE SHIFTING APPARATUS

Larned A. Meacham, Summit, N. J., assignor to Bell Telephone Laboratories, Incorporated, New York, N. Y., a corporation of New York Original application June 22, 1943, Serial No. 491,791. Divided and this application December 14, 1946, Serial No. 716,293

5 Claims. (Cl. 178—44)

This invention relates to phase shifting apparatus and particularly to phase shifting apparatus of a type which is of use in apparatus for producing an indication of the range of a distant object.

In accordance with an embodiment of the invention herein shown and described, there is provided a phase inverting and phase shifting circuit upon the input terminals of which may be impressed, for example, an intermittent oscillatory wave derived from an oscillatory circuit such as is shown and described in my application Serial No. 491,791, filed June 22, 1943 (now Patent No. 2,422,204, granted June 17, 1947), for a Range indicator, of which this application is a division. The phase inverter circuit provides an accurately balanced low impedance input to the phase shifter and is designed to present an extremely high impedance to the antiresonant circuit of the timing wave generator to which it is coupled. In order to minimize the time requirement for the phase shifter to reach steady state response to each group of timing oscillations, the phase shifting circuit is designed so that it presents a substantially pure resistance load to the output of the phase inverter circuit to which it is coupled. The phase shifting condenser of the phase shifter is an improvement over the condenser disclosed in my United States Patent No. 2,004,613, granted June 11, 1935. It is designed to simplify its manufacture, to provide complete shielding, to avoid use of moving contacts and to obtain satisfactory capacitive balances through inherent mechanical symmetry.

Figure 1:
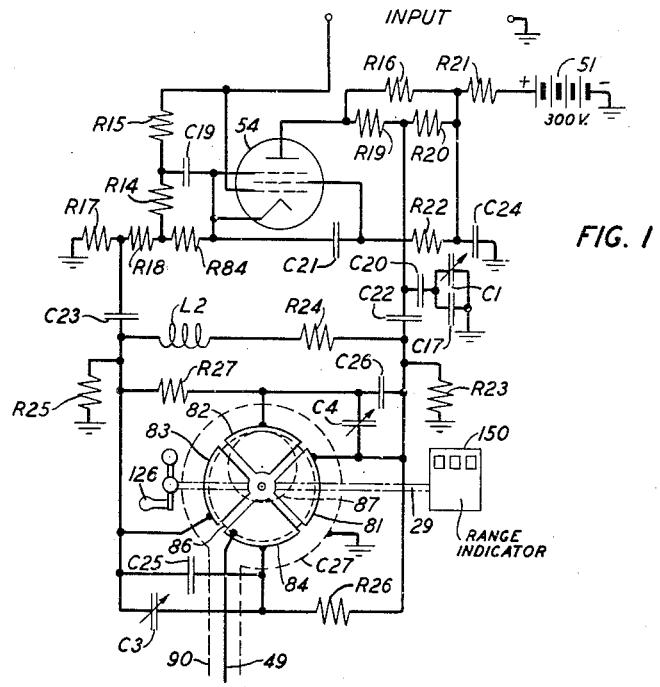
Fig. 1 is a schematic view of a phase inverter and phase shifter circuit in accordance with the invention.

The phase inverter circuit is used to provide an accurately balanced low-impedance input to the phase shifter. It also employs cathode feedback to present an extremely high input impedance to the antiresonant circuit (not shown) in the circuit connected to the input terminals, thus minimizing damping and stray capacitance effects. The anode current path of electric discharge tube 54 may be traced from the positive 300 volt terminal of battery 51 through 1,000 ohm resistor R21, 1,000 ohm resistor R20, 6,000 ohm resistor R19, the anode-cathode path of tube 54, 180 ohm resistor R84, 6,000 ohm resistor R18 and 1,000 ohm resistor R17 to ground. R17 and R20 are equal resistances across which the balanced output voltages appear. R18 is used to increase the amount of cathode feedback for the purpose of obtaining high input impedance and R19 balances the resistance of R18 in the anode circuit. The anode current through R84 produces a voltage drop which is applied to the control electrode for biasing it through a filter formed by .1 megohm resistor R14 shunted by a .001 microfarad condenser C19 and through .5 megohm resistor R15. This arrangement further magnifies the resistance component of the input circuit. Positive voltage from the 300 volt source is supplied to the screen grid through R21 and 0.25 megohm resistor R22. The screen grid is connected to the cathode through .006 microfarad condenser C21 so that the alternating screen grid current flows through the tube without affecting the external anode and cathode circuits. One terminal of resistor R22 is connected through condenser C21 to the cathode and the other terminal of R22 is connected through .5 microfarad condenser C24 to ground. With respect to the alternating timing voltage, therefore, resistor R22 is effectively in shunt with the resistors connected in the circuit between cathode and ground. The resistance of R22 is therefore balanced by the .25 megohm resistor R16 connected between the anode and the common terminal of resistors R20 and R21. Capacitive unbalance of the anode and cathode to ground is corrected by a variable 100 micromicrofarad condenser C1, shunted by 50 micromicrofarad condenser C17, connected between ground and through .001 microfarad protecting condenser C20 to the anode of tube 54.

The balanced output of the phase inverter is connected through .1 microfarad condensers C22 and C23 to a phase splitting circuit comprising two parallel paths the one path comprising 750 micromicrofarad condenser C26, a 75 micromicrofarad variable condenser C4 being in shunt with C26, connected in series with 3,000 ohm resistor R27, and the other path comprising 3,000 ohm resistor R26 connected in series with 750 micromicrofarad condenser C25, 75 micromicrofarad variable condenser C3 being in shunt with C25. The plate of condenser C22, going to the phase splitting circuit, and the plate of condenser C23 also going to the phase splitting circuit, are connected through 0.1 megohm resistors R23 and R25, respectively, to ground.

Figure 2:
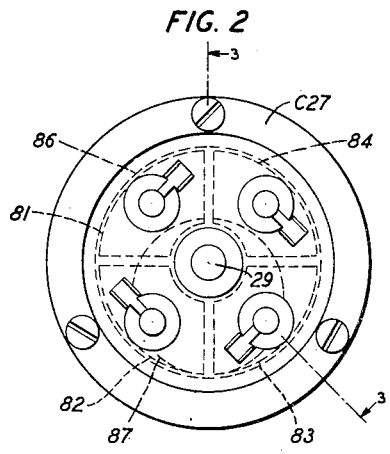
Fig. 2 is a view in elevation of a phase shifting condenser which is used in the phase shifter of Fig. 1.
Figure 3:
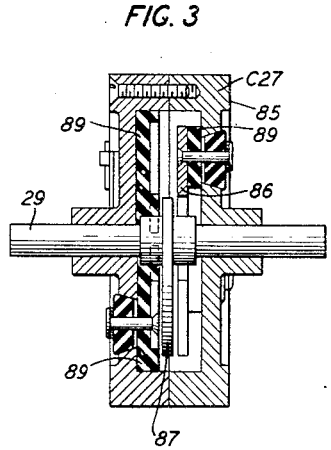
Fig. 3 is a sectional view taken along the line 3—3 of Fig. 2.

The phase shifting condenser C27 (see Figs. 2 and 3) comprises an outer metallic casing 85 and metallic ring stator 86, four metallic stator sectors 81, 82, 83, 84 and a dielectric rotor 87 having a dielectric constant materially different from that of air. The rotor may also be made of metal grounded or insulated from ground, but the dielectric rotor is preferable. The dielectric rotor is mounted on a metallic shaft 29 the bearings for which are provided by the outer casing 85, the latter also providing shielding. The stator members 81, 82, 83, 84 and 86 are supported by insulating members 89 from the casing 85. The four-phase voltages are supplied to the stator sectors 81, 82, 83 and 84 which are equal in area and shape and are accurately parallel to the ring stator 86. The casing 85 is connected to a metallic shield 90 around a first amplifier stage of the pulse generator (not shown) to which the output of the phase shifter is connected, the shield being grounded.

It will be seen that the potentials impressed upon opposed stator sectors of the phase-shifting condenser are 180 degrees out of phase while the potentials at any two adjacent sectors are 90 degrees out of phase. All four potentials are of equal amplitude.

If the resistance R26 or that of R27 is equal to R and the capacitance of C26 and C4 in parallel or that of C25 and C3 in parallel is equal to C, then each of the two parallel paths of the phase splitting circuit satisfies the equation $$R = X_c = \frac{1}{2\pi f C}$$

where $X_c$ is the capacitive reactance and $f$ is the frequency. The load impedance $Z_1$ presented by these elements to the phase inverter circuit, neglecting any small effect of C27 is $$Z_1 = \frac{R}{2} - j\frac{X_c}{2}$$

In order to minimize the time required for the phase shifter to reach steady state response to each intermittently produced timing wave, it is desirable to have this impedance a pure resistance. This is realized by connecting the path comprising inductive element L2 having an inductance of 3.64 millihenries in series with 1,500 ohm resistor R24 in shunt with the path comprising C26 and R27 and with the path comprising R26 and C25, this added impedance due to L2 and R24 being equal to the conjugate of $Z_1$, that is $$\frac{R}{2} + j\frac{X_c}{2}$$

Under this condition the load impedances $Z_1$ equals $$\frac{R}{2}$$

for all frequencies up to a high harmonic of the timing wave, which therefore appears undistorted on stator sectors 81 and 83. The phase shifted waves on stator sectors 82 and 84 approach their steady state condition by way of an exponential starting transient the time constant of T of which is equal to RC. Since $$R = \frac{1}{2\pi f c}, \quad T = RC = \frac{1}{2\pi f}$$

which corresponds to one radian of the timing wave. It is desirable that this transient be short so that the timing wave may be sufficiently accurate for the measurement of short ranges. The condenser C1 may be set permanently in manufacture so that the over-all calibration of the range unit in yards is precisely correct for two diametrically opposed positions of the phase shifter condenser C27 and the range calibration may be made correct for two angular positions at right angles to the first-mentioned positions by manufacturing adjustment of the trimmer condensers C3, C4. The accuracy at intermediate positions of the condenser C27 is dependent upon the amplitude balance of the voltages on the four stator sectors and upon the similarity of the four sections of the condenser C27. The potential of output lead 49 going to the ring stator 86 with respect to ground may be impressed upon the input circuit of an amplifier. Each complete revolution of the shaft 29 in one direction or the other shifts the phase of the timing wave in a corresponding direction through one cycle.

What is claimed is:

1. A phase shifting condenser comprising a first stator plate, a plurality of stator plates similar to each other and so positioned with respect to said first stator plate that the capacitances of said plurality of stator plates respectively to said first stator plate are equal when the dielectric between said first stator plate and said plurality of stator plates is uniform, and means for varying the capacitance between said first stator plate and the plates of said plurality of stator plates, said means comprising a rotor of dielectric material only positioned between said first stator plate and said plurality of stator plates.

2. A phase shifting condenser comprising a plurality of similar stator plates of conducting material substantially in a single plane and symmetrically arranged with respect to a point in said plane, a common stator plate spaced from said plurality of stator plates so that the capacitance between each of said plurality of stator plates and said common plate is the same when the intervening dielectric is uniform, a circuit comprising the capacitances between said common stator plate and said plurality of stator plates, respectively, and a rotor insulated from said circuit mounted eccentrically on a shaft passing through said point so that a major portion at least of the rotor moves about said point in a plane between the plane of said plurality of stator plates and that of said common stator plate for changing the capacitance between said common stator plate and the plates of said plurality of plates.

3. Apparatus for shifting the phase of an alternating wave comprising a condenser having a first stator plate, four stator plates the capacitances of which to said first stator plate are equal when the dielectric between said first stator plate and said four stator plates is uniform, a circuit comprising the capacitances between said first stator plate and said four stator plates, respectively, means for impressing upon said four stator plates alternating potentials with respect to a point of reference potential in said circuit, the potentials on opposite plates being 180 degrees out of phase and the potentials on adjacent plates being 90 degrees out of phase with respect to each other, and a rotor insulated from said circuit between said first stator plate and said four stator plates for changing the phase of the alternating potential difference applied to said circuit.

4. Apparatus in accordance with claim 3 in which means are provided for adjusting the phase of the potentials applied to said plurality of stator plates with respect to each other.

5. In combination, a space current device having an anode, a cathode and a control electrode, a first circuit connecting said anode and said cathode comprising in series a source of space current, a first resistance means and a second resistance means, a second circuit connecting said control electrode and said cathode comprising said first resistance means, means for impressing an oscillatory wave upon said second circuit, a plurality of current paths connected in parallel between two terminals, each path comprising two impedances in series, means for deriving from said first circuit two alternating potentials which are equal in magnitude and opposite in phase with respect to a fixed reference potential, means for impressing said derived potentials upon said terminals, respectively, of said parallel paths, a phase shifting device comprising four sector conducting plates substantially in one plane, an opposed conducting plate substantially in a second plane parallel to the first plane and a dielectric rotor substantially in a third plane parallel to and between the first and second planes, means for rotating said rotor in said third plane about an axis substantially perpendicular to said planes, means for connecting said two terminals to two opposed sector plates, respectively, of said phase shifting device, means for connecting the junction of the two impedances of one of said paths to a third of said sector plates, means for connecting the junction of the two impedances of another of said paths to the fourth of said sector plates, and means for utilizing the difference of the potential of said conducting plate in said second plane and said fixed reference potential.

LARNED A. MEACHAM.

REFERENCES CITED

The following references are of record in the file of this patent:

UNITED STATES PATENTS

| Number | Name | Date |
|---|---|---|
| 2,000,678 | Van Der Pol et al. | May 7, 1935 |
| 2,147,728 | Wintringham | Feb. 21, 1939 |
| 2,332,253 | Peterson | Oct. 19, 1943 |
| 2,353,672 | Keck | July 18, 1944 |
| 2,371,905 | Mathes | Mar. 20, 1945 |